D. V. BOUREAU.
SNUBBER.
APPLICATION FILED JAN. 14, 1920.

1,421,900.

Patented July 4, 1922.

INVENTOR
D. V. Boureau.
BY
Edward N. Pagelsen,
ATTORNEY

UNITED STATES PATENT OFFICE.

DÉSIRÉ V. BOUREAU, OF DETROIT, MICHIGAN.

SNUBBER.

1,421,900.   Specification of Letters Patent.   Patented July 4, 1922.

Application filed January 14, 1920. Serial No. 351,383.

*To all whom it may concern:*

Be it known that I, DÉSIRÉ V. BOUREAU, a citizen of France, and residing at Detroit, in the county of Wayne and State of Michigan, have invented a new and Improved Snubber, of which the following is a specification.

This invention relates to means for preventing sudden and violent rebounds of the bodies of vehicles when traveling over rough roads, and its object is to provide a snubber which cannot get out of order, is not liable to be broken, which can be constructed at moderate cost, and is practically subject to no wear.

This invention consists in a casing adapted to be connected to the body of the vehicle, a shaft rotatably mounted therein, a lever arm secured to the shaft, means connecting the outer end of the lever arm to the axle of the vehicle, a longitudinally slidable member within the casing, a circular wedge rotatable with the shaft and adapted to move the slidable member in one direction, and resilient means to press this slidable member toward said wedge.

It further consists in forming one end of the casing adjustable so as to vary the initial tension on the circular wedge.

It also consists in the details of construction illustrated in the accompanying drawing and particularly pointed out in the claims.

Figure 1:
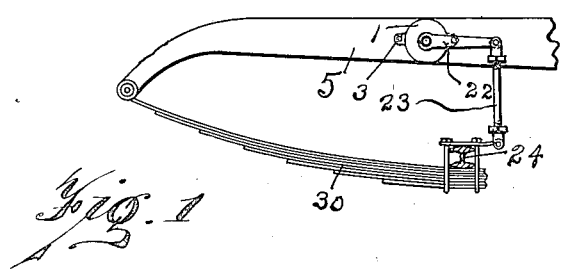
Figure 2:
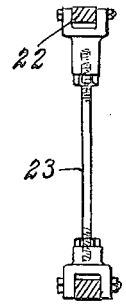
Figure 3:
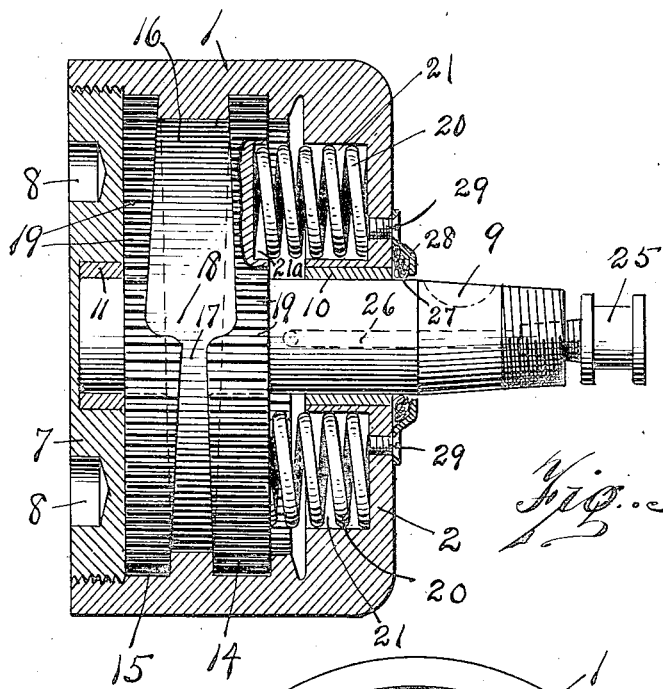
Figure 4:
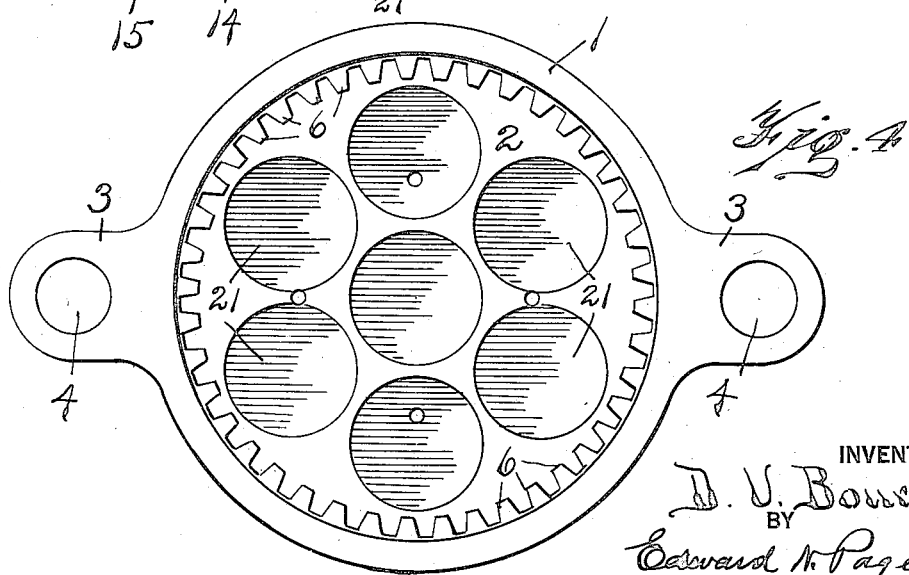

In the drawing, Fig. 1 is a side elevation of the front end of an automobile frame showing my improved snubber in position. Fig. 2 is a front elevation of a connecting link. Fig. 3 is a central longitudinal section of the snubber. Fig. 4 is an elevation of the casing thereof.

Similar reference characters refer to like parts throughout the several views.

The present snubber has a casing preferably of cast steel and consisting of a cylindrical portion 1, an end 2 integral therewith and lugs 3 provided with holes 4 for the bolts by means of which it may be secured to the side bar 5 of the vehicle frame. The cylindrical part 1 is provided with longitudinal splines 6, preferably in the form of gear teeth, the open end being threaded to receive the head 7 which is provided with holes 8 to receive a proper wrench. The end 2 of the casing is centrally bored to receive a shaft 9, a bushing 10 of proper bearing metal being provided if desired. A similar bushing 11 may be used to form the bearing for the shaft in the head 7.

Slidable in the casing are two non-rotatable disks 14 and 15, and between them and rotatable with the shaft is a circular wedge 16 whose point 17 and butt 18 are shown in Fig. 3. The disks 14 and 15 are provided with grooves 19 to receive the splines 6 and are prevented from turning thereby, and while their outer faces are parallel, their inner faces are inclined to fit the inclined surfaces of the circular wedge 16.

The disk 15 and the end 2 of the casing are formed with recesses 21 and 21ª to receive the compression springs 20 which press the disks and the wedge between them against the head 7.

A crank arm 22 is mounted on the outer end of the shaft 9 and a link 23, preferably adjustable, connects the end of the crank arm to the axle 24 of the vehicle. An oil cup 25 is shown screwed into the end of the shaft, a passage 26 leading therefrom to discharge lubricant into the casing and preferably keeps it half full. Leakage of lubricant is prevented by the packing 27 and the packing-holding ring 28, which is secured in position by the screws 29.

The position of the crank arm 22 shown in Fig. 1 is that desired when the vehicle is traveling under normal load. A sudden bump will cause the axle to be forced up relative to the side bar 5 against the force of the spring 30, until the arm 22 extends up at an angle which may be as much as forty-five degrees, after which the rebound of the spring tends to swing the arm 22 down about the same distance. But this rebound is what this snubber is intended to slow down and reduce, and it does this by turning the wedge 16 between the disks 14 and 15 against the pressure of the springs 20.

In assembling the device and mounting it on the vehicle, the parts are first put together as shown in Fig. 3 with the head 7 screwed in tightly against its seat. The casing is then attached to the side bar 5 with the arm 22 extending to the right. This arm is then swung around about 180 degrees until it reaches the position shown in Fig. 1 when it is connected to the axle by means of the link 23. This turning forces the circular wedge to separate the disks 14 and 15 against the pressure of the springs 20 and puts considerable tension on these springs. Upward movement of the arm 23 is not resisted as it turns back the wedge, so that the spring 30 may absorb the blows of the roadway. But any tendency of the spring 30 to throw up the frame 5 is strongly resisted by the snubber whose springs 20 resist the turning of the wedge to the right in Fig. 1.

The number of these springs 20 and their form is immaterial so long as sufficient pressure is exerted against the disk 14 to be transmitted to the wedge 16, and in fact, all the details of construction and the proportions of the parts may be varied by those skilled in the art without departing from the spirit of my invention as set forth in the following claims.

I claim:—

1. In a snubber, the combination of a casing adapted to be secured to one part of a vehicle and a circular wedge rotatably mounted therein and whose inclined surface extends from a shoulder around the wedge to said shoulder, means to connect the wedge to another portion of the vehicle so it may be turned when the two parts of the vehicle approach each other, a non-rotatable plate movable axially of the wedge by the wedge when the wedge is turned, and resilient means to resist such axial movement of the plate.

2. In a snubber, the combination of a casing adapted to be secured to one part of a vehicle, a shaft rotatably mounted therein, a circular wedge rotatable with the shaft and having an inclined surface on each side extending from a shoulder around the shaft to said shoulder, a disk slidable in the casing and prevented from rotating therein and having one side inclined complementary to said wedge, and engaging one side thereof, a second disk within the casing and prevented from rotating therein and having one side inclined complementary to and engaging the other side of the wedge, a crank arm secured to the shaft and means connecting it to the axle of the vehicle, and springs to press said disk against the wedge.

3. In a snubber, the combination of a casing adapted to be secured to one part of a vehicle, a shaft rotatably mounted therein, a circular wedge rotatable with the shaft, a disk slidable in the casing and prevented from rotating therein and having one side inclined complementary to said wedge, a crank arm secured to the shaft and means connecting it to the axle of the vehicle, and a series of compression springs mounted within the casing in engagement with said disk to press it against the wedge.

4. In a snubber, the combination of a cylindrical casing provided with one closed end and adapted to be secured to one part of a vehicle and having internal longitudinal splines, a pair of disks slidable within the casing and having notches in their peripheries to receive the splines, a head to close the open end of the casing, a shaft rotatably and axially mounted in the casing, a circular wedge secured to the shaft and adapted to separate said disks when turned in one direction, springs mounted in the casing to press the disks and wedges together, a crank arm connected to said shaft, and means to connect the crank arm to the axle of the vehicle.

DÉSIRÉ V. BOUREAU.